US 010791876B2

(12) United States Patent
Sutton et al.

(10) Patent No.: US 10,791,876 B2
(45) Date of Patent: Oct. 6, 2020

(54) OPTICAL RECOGNITION INTERLOCK SYSTEM FOR A BLENDER

(71) Applicant: Vita-Mix Management Corporation, Olmsted Township, OH (US)

(72) Inventors: Christopher M. Sutton, Olmsted Township, OH (US); David J. Kolar, Stow, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 436 days.

(21) Appl. No.: 15/517,317

(22) PCT Filed: Oct. 13, 2015

(86) PCT No.: PCT/US2015/055299
§ 371 (c)(1),
(2) Date: Apr. 6, 2017

(87) PCT Pub. No.: WO2016/058001
PCT Pub. Date: Apr. 14, 2016

(65) Prior Publication Data
US 2017/0303744 A1   Oct. 26, 2017

Related U.S. Application Data

(60) Provisional application No. 62/062,213, filed on Oct. 10, 2014.

(51) Int. Cl.
*A47J 43/07*   (2006.01)
(52) U.S. Cl.
CPC .................. *A47J 43/0772* (2013.01)

(58) Field of Classification Search
CPC ............... A47J 43/0772; A47J 43/07
(Continued)

(56) References Cited

U.S. PATENT DOCUMENTS

| 5,957,577 A | 8/1999 | Dickson et al. |
| 2005/0056160 A1 * | 3/2005 | Mulle ................. A47J 43/0788 99/492 |

(Continued)

FOREIGN PATENT DOCUMENTS

| DE | 102012101756 | 9/2013 | |
| DE | 102012101756 A1 * | 9/2013 | ............. A47J 36/10 |

(Continued)

OTHER PUBLICATIONS

Patent Cooperation Treaty (PCT), International Search Report and Written Opinion for Application PCT/US2015/055299 filed Oct. 13, 2015 dated Dec. 28, 2015 International Searching Authority, US.

(Continued)

*Primary Examiner* — Thien S Tran
(74) *Attorney, Agent, or Firm* — McDonald Hopkins LLC

(57) ABSTRACT

A blending system is shown and described herein. The blending system may include a base including a motor, a blade selectively and operably engaged with the base, where the motor rotates the blade, a container having an open end and a lid configured to cover the open end. The blending system may also include an optical interlock detector that may include a camera positioned on the base and indicia positioned at a predetermined location on a lid, wherein the camera detects the indicia and position of the lid to permit operation of the blender.

18 Claims, 9 Drawing Sheets

(58) Field of Classification Search
USPC .................... 99/331, 337, 492; 366/206, 251
See application file for complete search history.

(56) References Cited

U.S. PATENT DOCUMENTS

| | | | |
|---|---|---|---|
| 2007/0297281 A1 | 12/2007 | Saunders et al. | |
| 2008/0273420 A1 | 11/2008 | Ferk et al. | |
| 2011/0258130 A1* | 10/2011 | Grabiner .............. | G06Q 10/087 705/317 |

FOREIGN PATENT DOCUMENTS

| | | |
|---|---|---|
| EP | 2987438 | 2/2016 |
| FR | 2791546 | 10/2000 |

OTHER PUBLICATIONS

European Patent Office, Extended European Search Report for Application No. 15848767.8, PCT/US2015055299, dated May 14, 2018, 8 pages.

* cited by examiner

OPTICAL RECOGNITION INTERLOCK SYSTEM FOR A BLENDER

CROSS-REFERENCE TO RELATED APPLICATION

This application claims the benefit of International Application No. PCT/2015/055299 filed on Oct. 13, 2015 and entitled "OPTICAL RECOGNITION INTERLOCKING SYSTEM FOR A BLENDER", which claims priority to and the benefit of U.S. Provisional Patent Application Ser. No. 62/062,213 (filed Oct. 10, 2014, and entitled "OPTICAL RECOGNITION INTERLOCK SYSTEM WITH BAR-CODE VERIFICATION"), the entirety of which are both incorporated herein by reference.

TECHNICAL FIELD

The present teachings relate to an interlock system for a blender, and more particularly, to a blending system that includes an interlock detector comprising an image sensor.

BACKGROUND

Blending systems are often used to blend and process foodstuffs. Conventional blenders generally include a base with a motor and a mixing container with a mixing blade disposed therein. A blender lid is adapted to cover the container. A user inserts contents within the container. The container is positioned on the base and a user controls the operation of the motor within the base to rotate the mixing blade within the container to mix the contents therein.

It may be desirable to generally prevent the mixing blades from rotating when the blender lid is removed from the container. Interlock systems may be utilized to attempt to prevent the mixing blades from rotating when the blender lid is not positioned on the container. These interlock systems generally prevent the operation of the rotation of the mixing blade unless the blender lid is covering the mixing container. Known blending interlock systems have been disclosed by U.S. Pat. No. 8,403,556 to Wu, wherein a latch cover mechanism with a link rod and a compression spring in communication with a power circuit control switch in the base of the blender. Additionally, U.S. Pat. No. 8,702,300 to Audette discloses a blending apparatus having a container, a lid for covering the container, and an attachment within the container. The attachment engages the lid and a drive member at the base of the blender to actuate a motor once the lid is secured to the container.

Typically, known blender interlocks require a physical connection between the lid and the motor. These interlocks generally include a system of mechanical arms, links, springs or other attachments that prevent the user from operating the motor to rotate the mixing blade unless the blender lid is secured onto the container. Additionally, mechanical interlock systems take up extra space for mechanical connection paths and these connection paths may not allow for sufficient vibration isolation or damping. Further still, these mechanical systems may be difficult to clean.

Therefore, a need exists for interlock systems that reduces the risk of false motor actuation, takes up less space, are not subject to an increase risk of damage caused by motor vibration, and are more robust in capability as well as durability.

SUMMARY

A blending system may include a base including a motor, a blade assembly within the container that is selectively and operably engaged with the base, where the motor drives the blade assembly, and a container having an open end. The blending system may also include a lid that is configured to be selectively attached to the container to cover the open end. In another aspect, the blending system may include an interlock detector adapted to permit operation of the motor when the lid is attached to the container to cover the opening.

In embodiment of the present disclosure, the lid may include a protrusion extending from a periphery of the container and indicia may be located on the protrusion. The interlock detector may include at least one camera located on the base and positioned to detect the indicia located on the lid. The interlock detector may permit operation of the motor when the camera detects the indicia and provides a positive signal. The positive signal may be generated by the interlock detector as the interlock detector identifies that the lid is associated with the blending system. The indicia may be a barcode such as a one-dimensional or two-dimensional barcode (e.g., QR). The interlock detector may be configured to identify a signal representative of spatial information between the lid and the opening of the container to permit operation of the motor.

A blending system may include a base encasing a motor, a blade within a container, and a lid configured to cover an open end of the container. The lid may include indicia. An interlock detector may be attached to the base for detecting a position of the lid relative to the container to allow operation of the motor.

In embodiment of the disclosed blending system, the interlock detector may include at lease one image sensor (e.g., a camera) that is configured to detect the lid and determine whether the lid is associated with the blending system. Image sensors may be positioned on the base and directed towards the open end of the container to detect the indicia on the lid as the lid is in the closed position over the open end of the container.

The disclosed blender may include a base encasing a motor with a blade in operative communication with the motor that is selectively engaged with the base. A container having an open end and a lid for covering the open end. An interlock detector for detecting the lid and detecting whether the lid is covering the open end of the container may permit operation of the motor when the lid is covering the open end of the container.

DESCRIPTION OF THE DRAWINGS

The present teachings may be better understood by reference to the following detailed description taken in connection with the following illustrations, wherein.

DETAILED DESCRIPTION

Figure 1:
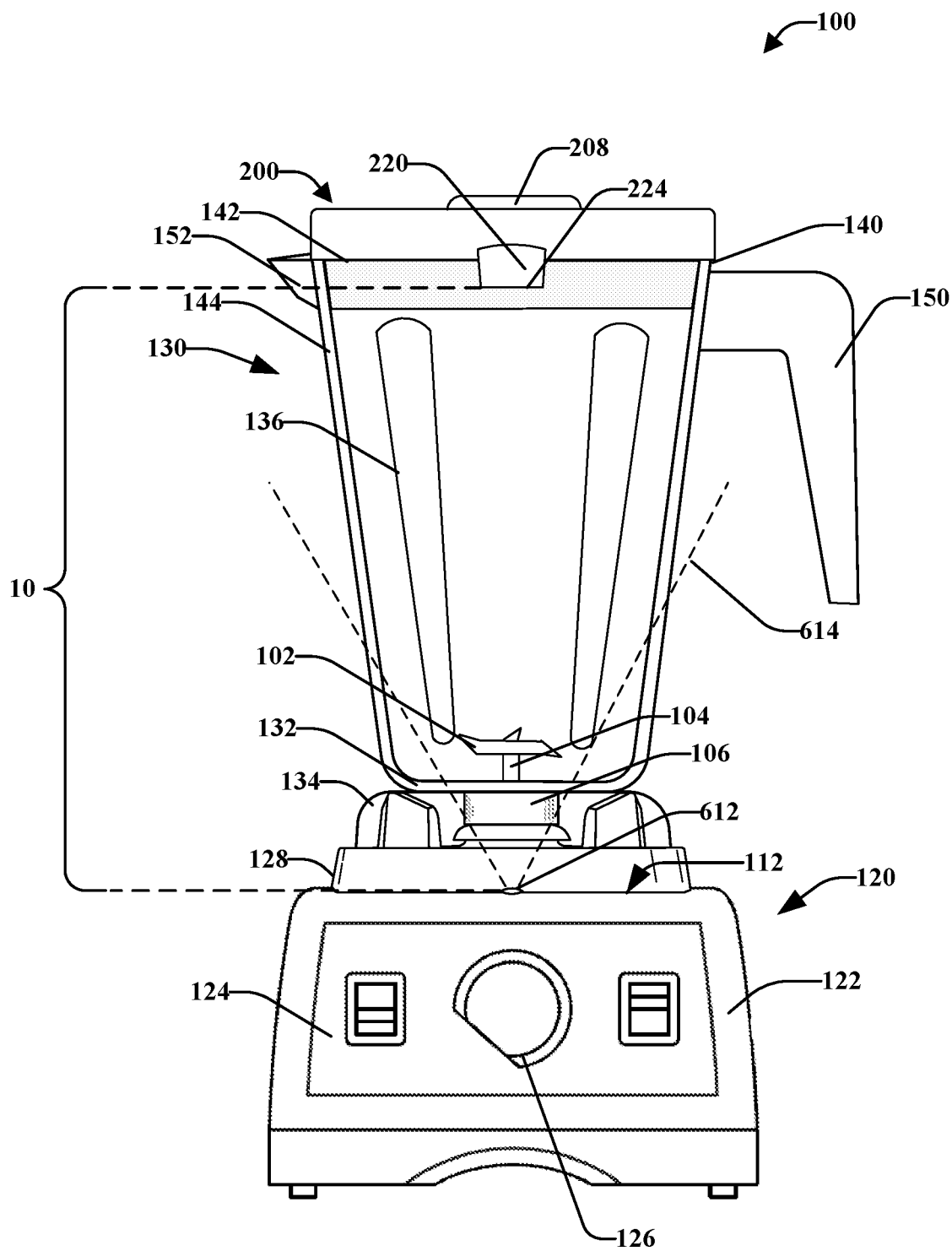
FIG. 1 is a front view of an embodiment of a blending system comprising an interlock detector in accordance with aspects of the present disclosure.

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings, e.g., features of each embodiment disclosed herein may be combined or replaced with features of the other embodiments disclosed herein. As such, the following description is presented by way of illustration only and should not limit in any way the various alternatives and modifications that may be made to the illustrated embodiments and still be within the spirit and scope of the present teachings.

It is noted that the various embodiments described herein may include other components and/or functionality. It is further noted that while various embodiments refer to a blender or a blending system, various other systems may be utilized in view of embodiments described herein. As such, references to a blender or blending system are understood to include food processor systems, and other mixing systems. A blending system may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such. Components of such systems may be removable, assembled, integrally formed, or the like.

Foodstuff may be added to the container. Furthermore, while blending of "ingredients," "contents" or "foodstuffs" is described, it is noted that non-food stuff may be mixed or blended, such as paints, epoxies, construction material (e.g., mortar, cement, etc.), and the like. Moreover, blending of foodstuff or ingredients may result in a blended product. Such blended products may include drinks, frozen drinks, smoothies, shakes, soups, purees, sorbets, butter (nut), dips or the like. Accordingly, terms such as "blended product" or "drink" may be used interchangeably unless context suggests otherwise or warrants a particular distinction among such terms. It is noted that, such terms are used by way of exemplary embodiments and are not intended to limit possible blended products and other blended products may result from blending ingredients.

Embodiments described herein relate to a blending system and/or methods. The blending system may comprise an interlock component that controls (e.g., prevents or allows) operation of a motor. The interlock component may include one or more image sensors that may detect or recognize an image (e.g., logo, barcode, symbol, pattern, etc.). In an example, the blending system may include a blender base that includes a motor. The blender base may include and/or communicate with an interlock component. The interlock component may include one or more image sensors (e.g., cameras, etc.). A container and a lid may be assembled and operatively coupled to the blender base. The interlock component may recognize the container and/or lid. In an aspect, the interlock component may allow operation of the motor when the container and the lid are recognized. If, for example, a user places the container on the blender base without a lid and/or with an improper lid, the interlock component will prevent operation of the motor.

According to at least one embodiment, the interlock component may determine spatial positions of the container and/or lid based on an image recognition process. The spatial positions may be relative positions of the container, lid, and/or blender base. In an aspect, the positions may be utilized to determine whether the container, lid, and/or base are operatively assembled. For instance, the interlock component can identify a container and/or lid as well as determine whether the container/lid are operatively assembled and attached to the blender base.

Figure 3A:
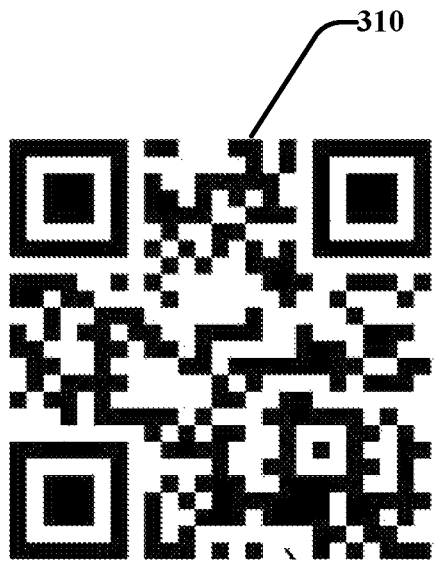
FIGS. 3A-3C is an enlarged view of embodiments of indicia on the mixing lid of FIG. 2 in accordance with aspects of the present disclosure.
Figure 3B:
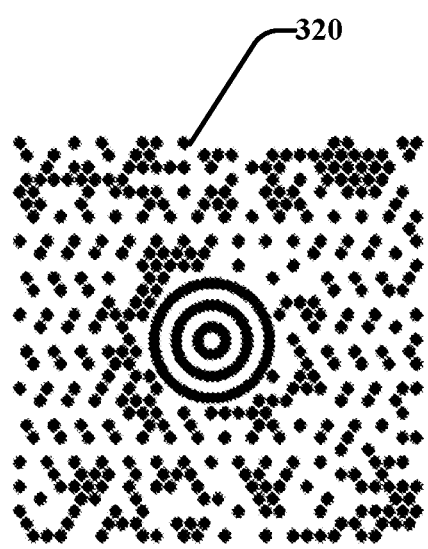
Figure 3C:
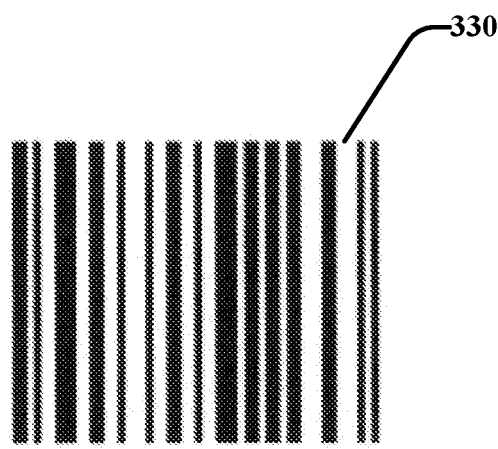

It is noted that the interlock component may recognize indicia (e.g., logos, coded images, textual data, patterns, etc.). The container and/or lid may include indicia printed, formed, or otherwise displayed thereon. In at least one example, the lid may include a barcode, such as a one-dimensional (e.g., line, dot, etc.), two-dimensional (e.g., matrix, QUICK RESPONSE ("QR") code, etc.), or the like. For instance, FIGS. 3A-3C illustrate indicia 310, 320, and 330 respectively. Such indicia may be utilized by various disclosed embodiments. It is noted that all or a portion of the indicia 310, 320, and/or 330 may be utilized to encode information.

Figure 4:
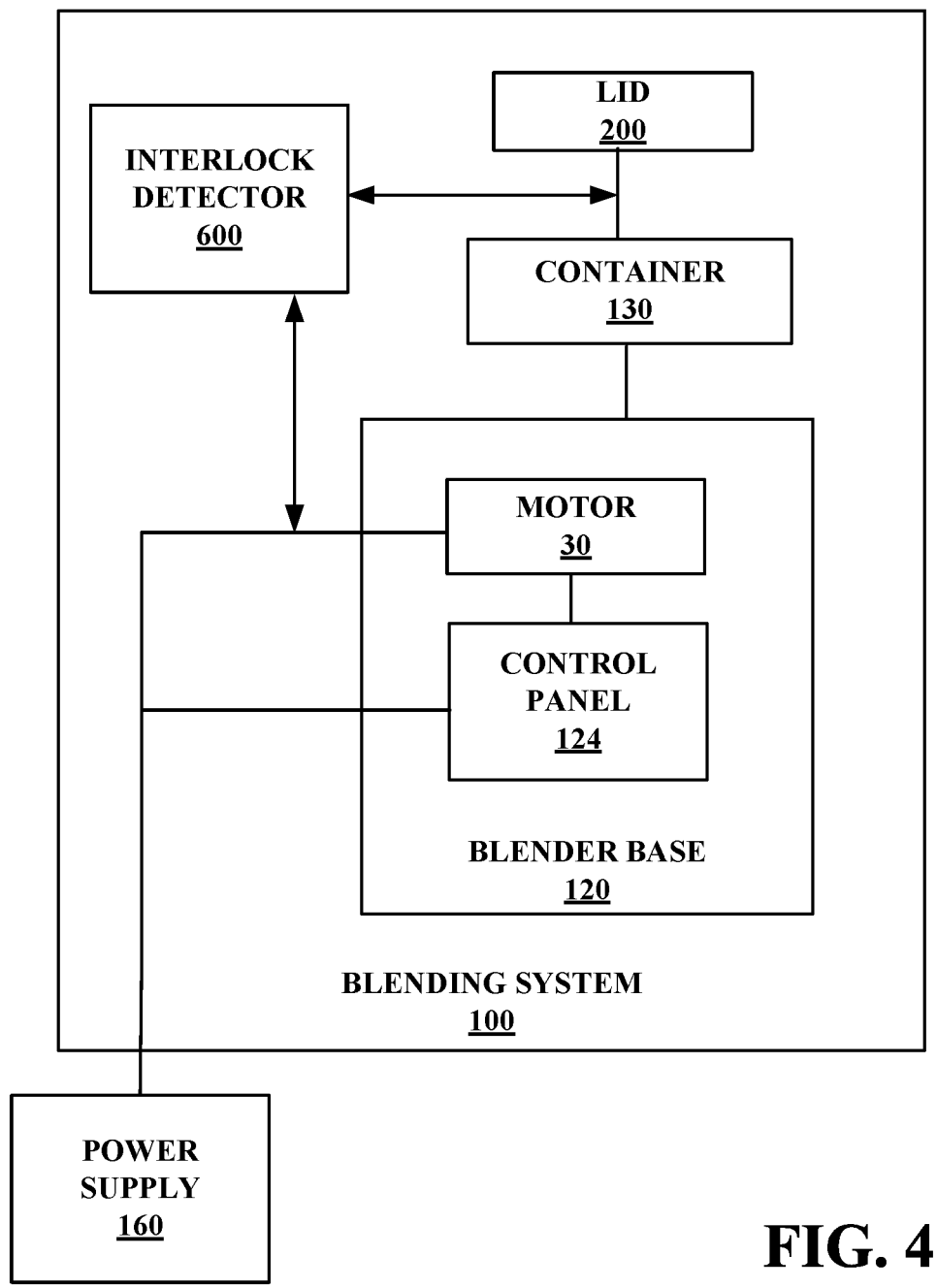
FIG. 4 is a schematic diagram of embodiments of a blender system comprising an interlock detector in accordance with aspects of the present disclosure.

Turning now to the figures, FIGS. 1 and 4 provide a blending system 100 according to various disclosed aspects. The blending system 100 may primarily include a blender base 120, a blade 102, a lid 200, and a container 130 of appropriate configurations. The blade 102 may be selectively and operatively coupled with the container 130 as described in more detail below. The blending system 100 may include an interlock detector 600 that may generally control operation of the blending system as described in more detail below. The blender base 120 may be any appropriate size and configuration. For instance, blender base 120 may be configured to house and generally protect operative components of the blending system 100 (e.g., a motor 30, circuitry, etc.).

As shown by FIG. 4, the blender base 120 may house motor 30 and associated gearing, sound damping components, and a fan (not shown). These operative components may be of any appropriate configuration—the present teachings are not limited to any specific configuration. The motor 30 may be in operative communication with a power supply 160 to provide the appropriate power to operate the blending system 100. While shown as separate components in FIG. 4, it is noted that the motor 30, control panel 124, power supply 160, and/or interlock detector 600 may comprise portions of blender base 120 and/or may be separate components in communication with each other.

The blender base 120 may include a control panel 124 positioned on a face 122 of the blender base 120. The control panel 124 may be of any appropriate configuration and may be utilized to set the operative condition of the blending system 100 by the user. By way of a non-limiting example, the control panel 124 may include a knob 126 to selectively adjust settings of the blending system 100, including, without limitation setting rotational speed of the blade 102 during operation of the blending system 100. The knob 126 may also be used to reset the system, turn the system on/off, select preprogrammed functions, and/or select a pulse function. It will be appreciated that the control panel 124 may further include alternative or additional input devices, such as buttons, switches, and other interface devices, such as an LCD or LED display. In another aspect, the control panel 124 may include an indicator (e.g., display screen, LED, etc.) to indicate states of a connectivity, such as whether operatively combinations of blender base 120, container 130, and/or lid 200 are utilized and/or appropriately interconnected.

The blender base 120 may include a pedestal 128 proximal to a top portion of the blender base 120. The pedestal 128 may be of any appropriate shape and size and may be materially integral with and/or separate from the blender base 120. By way of example, the pedestal 128 may be sized and shaped to cooperate with the blade 102 and container 130 as described in more detail below. The pedestal 128 may be of a shape such that an interior of the pedestal 128 corresponds with the external shape of an engaging portion 134 or bottom portion of the container 130. In the present example, the interior shape of the pedestal 128 and the external shape of the engaging portion 134 of the container 130 are generally complimentary.

The container 130 that may be of any appropriate configuration shape and size. The container 130 may comprise a variety of volumetric capacities. For instance, the container may be n ounces (oz.), where n is a number (e.g., 20, 24, 32, 48, 64, 72, etc.). The container 130 may include flow impeding members, such as ribs 136 projecting from an interior side of the container 130. The ribs 136 may comprise one or more protrusions generally spanning a length of the container 130 and may have various widths. In the present example, there are four (4) ribs 136 spaced about the container 130. The ribs 136 may be configured to aid in agitating contents and may provide structural stability to the container 130.

The container 130 may include an open end 140 through which material may be inserted or removed. The open end 140 may be of any appropriate configuration and size. The open end 140 may include a shoulder 142 that circumscribes the open end 140 for supporting a mixing lid 200 thereon. Additionally, a wall 144 may extend from the shoulder 142. In an embodiment, the wall 144 generally circumscribes the shoulder 142. The wall 144 and shoulder 142 define an area that is configured to operably support the lid 200 to cover the open end 140 of the container 130.

In another aspect, container 130 may include an engaging portion 134 configured to operatively and selectively engage with the pedestal 128. The engaging portion 134 may be of any appropriate configuration and type, including, without limitation being a generally continuous wall that extends from a container bottom 132 and is shaped to engage with the configuration of the pedestal 128. Regardless of the configuration of the engaging portion 134, when secured to the pedestal 128, the blade 102 within the container 130 becomes operably engaged with the motor 30 such that as power is introduced to the motor 30, the blade 102 is caused to rotate within the container 130 to mix any contents therein.

The blade 102 may be connected to the container 130 in any appropriate manner. The blade 102 may be of any appropriate configuration, type and size. The present teachings are not limited to the illustrated blade 102. For instance, the blade 102 may be of a shearing blade and/or a conventional blender blade configuration and, as such, may include a plurality of radially extending blades that are carried by, and positioned above a container bottom 132 by a vertically oriented blade shaft 104. The blade shaft 104 may extend downwardly through a hub or bearing 106 within the container bottom 132. A spline may be secured to the end of the blade shaft on the second side of the container bottom 132. The spline (not shown) of the blade shaft engages with a splined coupler (not shown) positioned within the pedestal 128, the splined coupler being connected to a motor shaft that extends from the motor within the blender base 120. Accordingly, when the container bottom 132 is positioned within the pedestal 128, rotation of the motor shaft caused by actuation of the motor is thereby transferred to the blade 102, which is rotatably positioned within the container 130.

Blending system 100 may include a lid 200 that is selectively engagable with the open end 140 of the container 130. The lid 200 may be of any appropriate configuration. For example and with reference to FIGS. 1 and 2, the lid 200 may include a base portion 202 and a wall portion 204 that extends from and generally circumvents the base portion 202. The wall portion 204 may have a distal edge 206. The lid 200 may be selectively engagable with the open end 140 in any appropriate manner, including, without limitation via compression fit, a snap-fit, a threaded engagement, magnetic coupling, or any appropriate means. As illustrated by FIG. 1, the wall portion 204 may engage against an inner surface of the radial wall 144 and the distal edge 206 abuts against the radial shoulder 142. However, this disclosure does not limit the configuration of the lid 200 and container 130 as any known configuration is contemplated herein.

The lid 200 may further include a cap 208 that may be selectively positionable relative the base portion 202. The cap 208 may be positionable to and from open and closed positions. In the open position, the cap 208 may allow contents within the container 130 to be expelled therefrom and may be sized to generally prevent a users hand from entering the container 130. In the closed position, the cap 208 may generally prevent contents of the container 130 from being expelled. The cap 208 may engage lid 200 such that a vent may be formed top expel steam, etc.

The container 130 may include at least one spout 152 and also may include at least one handle 150 for ease of use. In the embodiment of FIG. 1, the spout 152 extends from the radial wall 144 and the handle 150 extends from the container 130 opposite the spout 152. The lid 200 may be configured to cover the open end 140 of the container 130 such that the wall portion 104 of the lid 200 also covers the spout 152. It is noted that the handle 150, radial wall 144, spout 152, or other portions of container 130 may comprise or be configured to display indicia.

Figure 5:
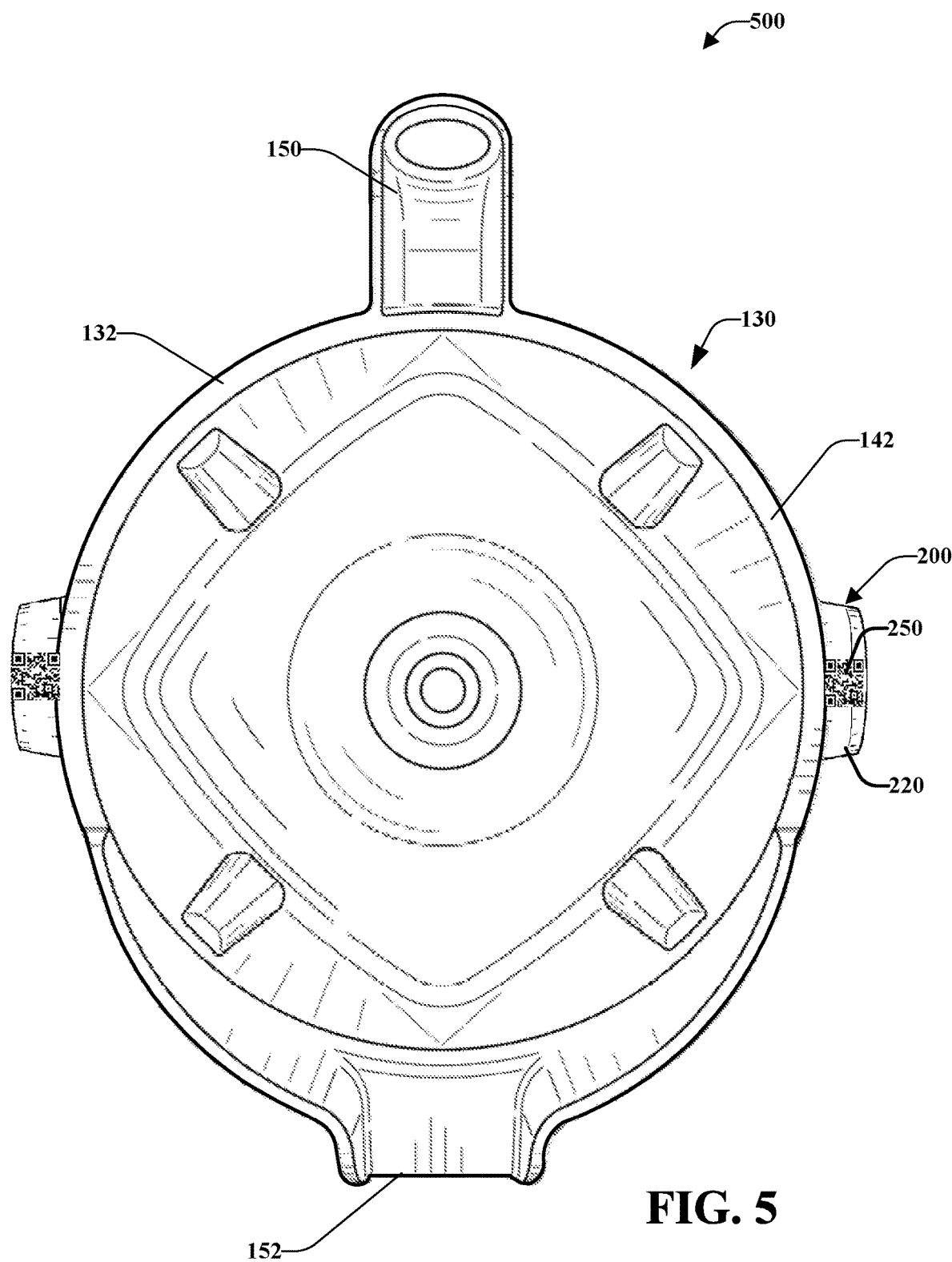
FIG. 5 is a bottom view of the lid of FIG. 2 and a container of FIG. 1 in accordance in accordance with aspects of the present disclosure.

The lid 200 may further include indicia 250. The indicia 250 may include any variety of patterns that may be detected by the interlock detector 600. The indicia 250 may be a pattern such as a barcode (e.g., QR code)—the present teachings, however, are not limited to these configurations. The pattern may be associated with an identifier (e.g., ID) that is assigned or otherwise correlated to a particular lid 200 (e.g., make, model, etc.). It is noted that any appropriate indicia 250 may be utilized. In one embodiment, the lid 200 may include a protrusion 220 that extends from the wall portion 104. As shown in FIG. 5, the protrusion 220 may be any configuration such as a flange or latch that is configured to extend past the radial wall 144 or other portion of the container 130. As illustrated by FIG. 1, the protrusion 220 radially extends from the lid 200 and generally conforms to or latches to the radial wall 144 of the container 130. The lid 200 may be prevented from unintended rotation relative to the container 130 as the protrusion 220 conforms within an opening or foothold in the radial wall 144. Alternatively, the protrusion 220 may include a gap that is configured to conform to receive the radial wall 144 therein when the lid 200 is in the closed position. In this embodiment, the protrusion 220 and lid 200 may be friction fit over the open end 140 of the container 130. Further still, the protrusion 102 and lid 200 may be snap-fit over the open end 140 of the container 130.

While shown as being displayed or otherwise positioned on protrusion 220, it is noted that the indicia 250 may be displayed on other portions of the lid 200. For instance, indicia may be displayed on base portion 202, wall portions 204, and/or distal edge 206.

Figure 6:
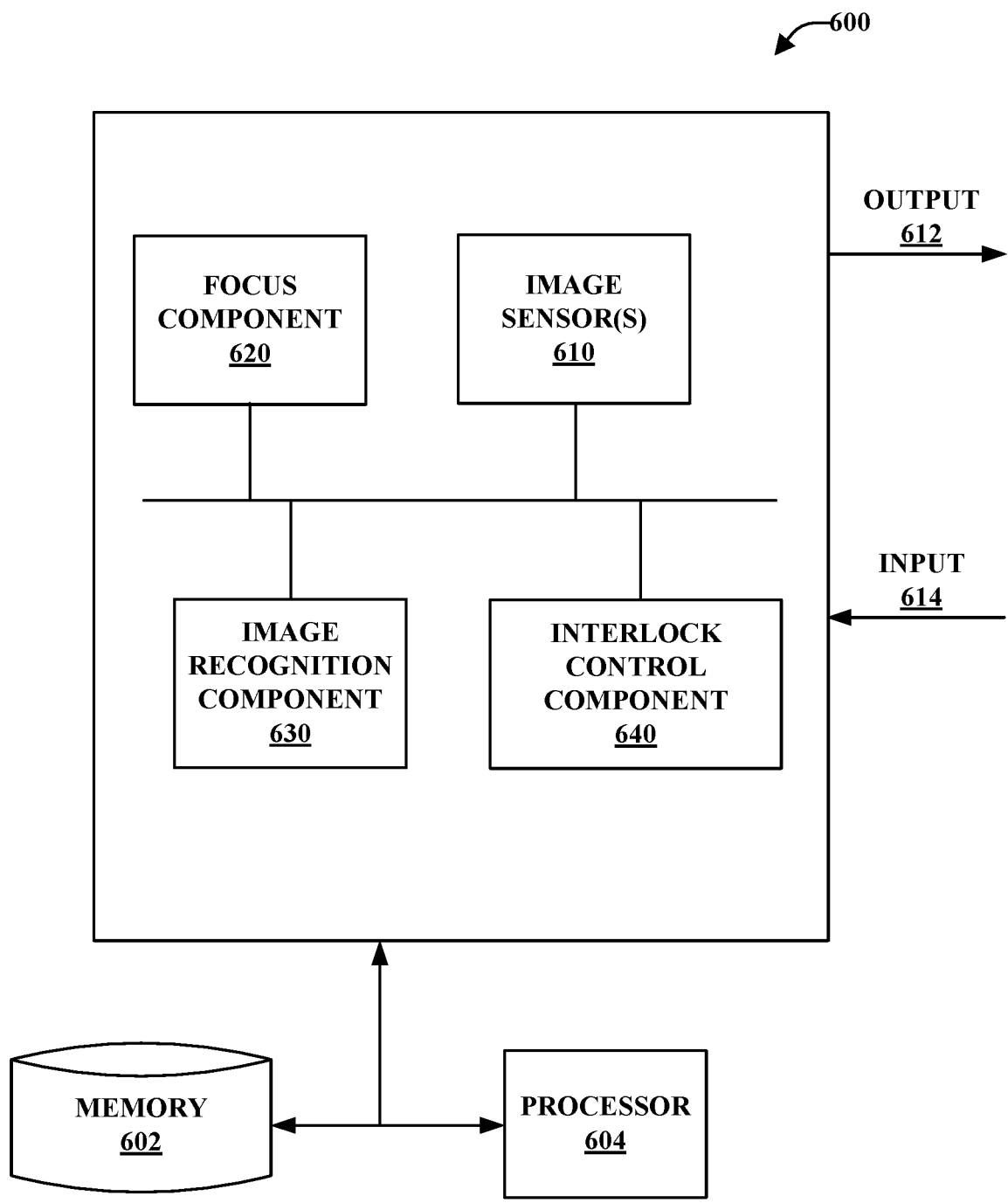
FIG. 6 is schematic diagram of embodiments of an interlock detector in accordance with aspects of the present disclosure.

Turning now to FIG. 6, with reference to FIGS. 1-5, there is an interlock detector 600 in accordance with various disclosed aspects. The interlock detector 600 may, for example, determine whether the lid 200, container 130, blender base 120, and/or other components, are operatively connected. The interlock detector 600 may include memory 602, processor 604, and/or image sensor(s) 610. Memory 602 may be configured for storing computer executable components such as focus component 620, image recognition component 630, and interlock control component. Processor 604 may facilitate operation of the computer executable components. It is noted that system 600 may include one or more devices, such as a user device, a blender device, or the like. It is further noted that one or more devices may comprise, at least in part, system 600. For instance, system 600 may be comprised, at least in part, by blender base 120, lid 200, container 130, etc. While shown as separate or distinct components, the components of system 600 may be comprised by one or more components.

In at least one embodiment, the interlock detector 600 may be configured to operatively recognize or identify lid 200, container 130, other components (e.g., a tamper, a utensil, a human body part) or lack thereof. In another aspect, the interlock detector 600 may determine whether lid 200, container 130, and/or blender base 120 are operatively interlocked. For example, image sensor(s) 620 may detect, capture, scan, or otherwise receive information (e.g., input 614) associated with images of and/or coded data (e.g., barcodes) of a lid 200, container 130, and/or other components. Based at least in part on the captured data, the interlock detector 600 may generate a control signal to control operability of motor 30. In an aspect, interlock control component 640 may generally prevent operation of the blade 102 when the lid 200 is not covering the open end 140 of the container 130, is not an appropriate lid, and/or is not operatively attached to the container 130.

It is noted that interlock detector 600 may process/determine the operative state of the blending system 100 upon occurrences of triggering events and/or continually determine the operative states, which are described in more detail herein. In one example, interlock detector 600 determines operative states only when a triggering event occurs/is occurring, such as when user attempts to initiate operation of the motor 30, while the motor 30 is operating, or the like.

More specifically, interlock detector 600 may monitor the blending system 100 to ensure that the container 130 and the lid 200 are present and/or whether any unintended items are positioned within the container 130, while the motor 30 is operating or a user attempts to operate the motor 30. In another aspect, interlock detector 600 may continuously or generally continuously monitor the blending system 100 to determine operative states.

Image sensor(s) 610 may include camera 612 having a field of view 614. Camera 612 may comprise any appropriate type and/or may utilize an appropriate image sensor. For example, camera 612 may comprise a complementary metal-oxide-semiconductor (CMOS), charge-coupled device (CCD), Back Side Illuminated CMOS, or other type of image sensor. It is further noted that the camera 612 may include an appropriate lens. For instance, the lens may be fixed-focus, full-focus, manual-focus, automatic-focus, or the like. In at least one example, the camera 612 may comprise a lens or protective lens that may be at least partially exposed to an external environment. This lens may, for example, be generally flush, concave, or convex with upper surface 112 of base 120. In at least one example, the lens may be convex with upper surface 112 such that foodstuff may be directed away from the lens. It is noted that the lens may comprise a protective coating, cover, or the like. While embodiments may describe camera 612, it is noted that the image sensor(s) 610 may comprise other or additional image sensors, such as laser scanners, CCD readers, or the like. For instance, laser scanners may be utilized to determine positional information and/or read barcodes (e.g., one-dimensional barcodes).

Figure 2:
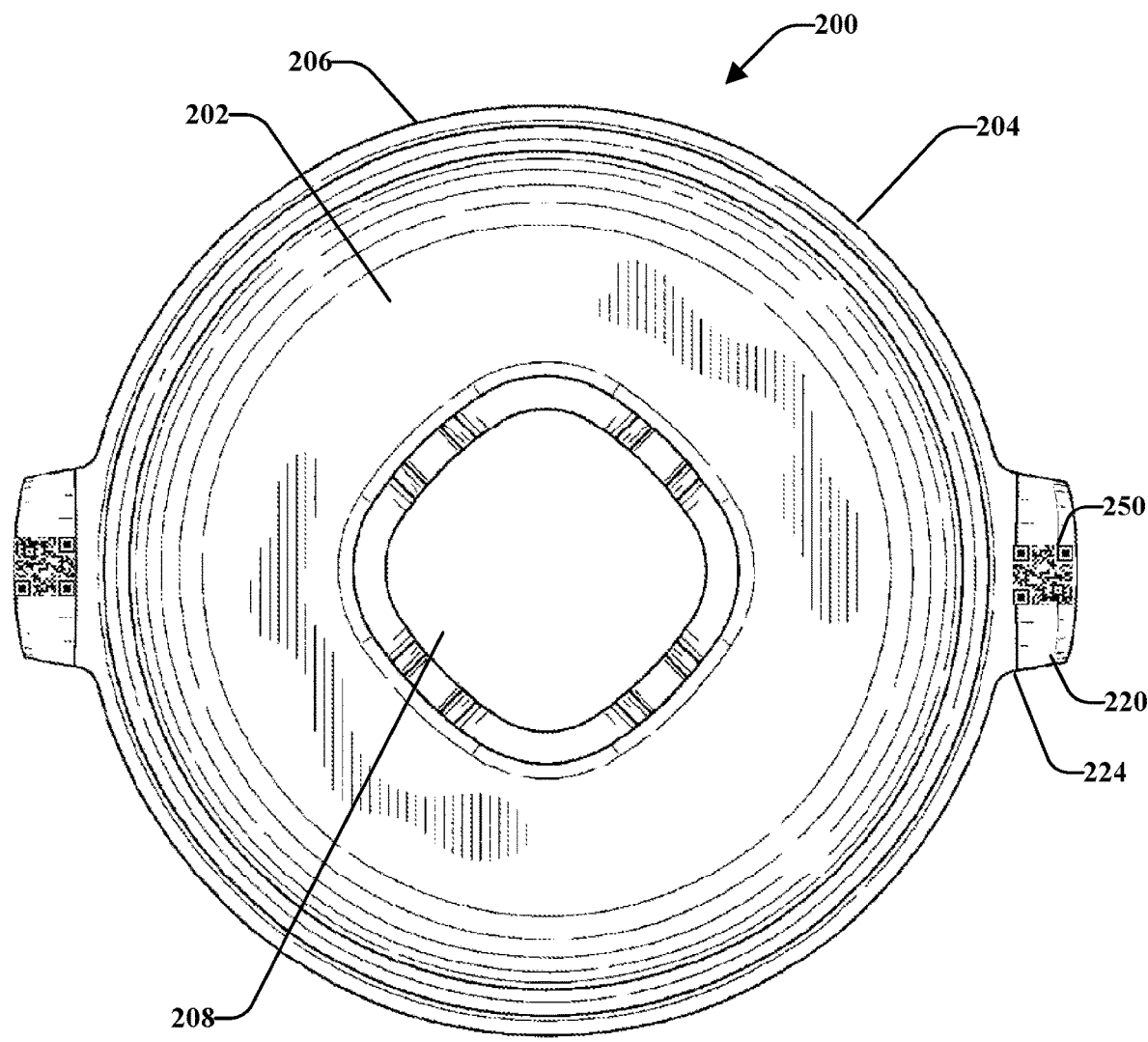
FIG. 2 is a bottom view of a lid of the blending system of FIG. 1 in accordance in accordance with aspects of the present disclosure.

Turning to FIG. 5 with reference to FIG. 6, illustrated is a bottom view of container 130 and lid 200 in an interlocked configuration. As illustrated, indicia 250 may be viewable by interlock detector 600 when the container 130 and lid 200 are operatively connected. In another aspect, portions of the container may be within field of view 614, such as radial shoulder 142, spout 152, handle 150, and/or indicia disposed thereon. The interlock detector 600 may be configured to identify (e.g., recognize) features of the lid 200 and/or container 130, as described herein. It is noted that the lid 200 may comprise m indicia 250, where m is a number. For instance, lid 200 may comprise a plurality of protrusions 220 which may include indicia 250. In an aspect, this may allow interlock detector 600 to comprise a reduced number of cameras (e.g., 1, 2, etc.) while still being able to capture an image of at least one of the indicia 250. In an example, as shown in FIG. 2, lid 200 may comprise two protrusions 220. Each protrusion 220 may comprise indicia 250. As shown in FIG. 1, blender base 120 may comprise one camera 612. With two protrusions 220, there is an increased chance that at least one indicia will be within field of view 614. It is noted that the interlock detector 600 may comprise j cameras or image sensor(s) 610, where j is number.

In at least one embodiment, the image sensor(s) 610 may capture images of the blending system 100 and image recognition component 630 may utilize pattern recognition processes to identify characteristics of lid 200, container 130, or other components. Characteristics may include shapes, sizes, makes/models, or the like. Determining the characteristics may be based on processing (e.g., reading, scanning, etc.) data received from a barcode or other indicia.

According to an aspect, the lid 200 and/or container 130 may comprise one or more indicia. As shown in FIG. 2, lid 200 may comprise indicia 250 positioned along a bottom portion 224 of the protrusion 220 such that the bottom portion 224 faces blender base 120 when lid 200 is in the closed position on the container 130 (e.g., FIG. 2 illustrates a closed position). In a further non-limiting example, the indicia 250 may be adhered to the protrusion 220 of the lid 200, integrally formed therewith, or otherwise attached thereto. Indicia 250 may comprise a barcode, such as a QR or other 2-dimensional barcode. The barcode may include a high bit count message such as a 124-bit or 128-bit code. The code may be detected/received by image sensor(s) 610 and processed by the image recognition component 630. Recognition of the code may allow image recognition component 630 to determine whether the lid 200 is an appropriate lid associated with the blending system 100, and if the lid 200 is operatively positioned over the opening 140 of the container 130.

It is noted that the indicia 250 may be formed by one or more portions of the blending system 100. For instance, the indicia 250 may be formed by a portion of the container 130 and the lid 200. When container 130 and lid 200 are aligned in an appropriate position, the different portions of the indicia may be aligned and/or readable (e.g., by image sensor(s) 612). In an aspect, the indicia 250 may be readable by the interlock detector 600 only when the container and lid 200 are operatively aligned in a predetermined configuration. For example, the portions of indicia 250 may align when the lid 200 is placed by the user into a predetermined position with respect to the container 130. Until container 130 and lid 200 are in this operative position, the image recognition component 630 may not be able to read and/or may ignore the portions of the indicia 250, such that the interlock detector 600 may prevent rotation of the blades 102. When the lid 200 is placed in the predetermined position with respect to the container 130, the interlock detector 600 may allow rotation of the blades 102, as described herein. While portions of lid 200 and container 130 are described as forming indicia 250, it should be understood that different and/or additional portions of the blending system 100 may be utilized to form the indicia 250.

The image recognition component 630 may receive and/or derive information from an image of the indicia 250 captured by the image sensor(s) 610. For instance, the image recognition component 630 may process a QR code and may derive coded information from the processed QR code. In an aspect, the coded information may be utilized to determine a make/model of lid 200, container 130, or the like. In another aspect, the coded information may be utilized to determine whether the combination of the portions of blending system 100 is an appropriate combination. In an operational example, the image recognition component 230 may determine if the correct lid 200/container 130 combination is in an operative position and may also determine the physical location of the lid 200 and or container 130.

In another aspect, the image recognition component 630 may determine relative positions (e.g., distance, physical location) of the lid 200, container 130, blender base 120, or the like. For instance, focus component 620 may control focus of image sensor(s) 610. The focus may be adjustable or non-adjustable (e.g., fixed-focus). In a fixed-focus system, the indicia 250 may be readable by the image sensor(s) 610 when the lid 200 and/or container 120 are in a predetermined location or position relative to the image sensor(s) 610. In this manner, indicia 250 is only readable within these positions. These positions correspond to operative states with proper alignment of blending system 100 and may be utilized by interlock control component 640, as described in more detail herein.

In an example, lid 200 may be associated with container 130 and may not be designed for use with other containers. Using the lid 200 with an inappropriate container may result a poor fit, or the like. Furthermore, lid 200 may be secured with container 130 by pressing or rotating the lid 200 into the container 130. If a user merely rests the lid 200 on the container 130 or holds/lifts the lid to access contents within container 130, the contents may be spilled during blending. Thus, as shown in FIG. 1, when a proper lid 200, container 130, and blender base 120 are appropriately and operatively coupled, the bottom portion 224 of lid 200 may be configured to be generally displaced a distance 10 from the camera 612. If an improper container 130 was used, bottom portion 224 may be a different distance from the camera 612. In another aspect, if a user lifts or otherwise manipulates lid 200, bottom portion 224 may be moved a different distance from camera 612. According to at least one embodiment, camera 612 is focused such that indicia 250 is readable at about distance 10 from the camera 612 and is not readable at distances other than about distance 10. It is noted that distance 10 may be a range of acceptable distances to allow for variance. In another aspect, the focus may allow for bottom portion 224 to be offset from (e.g., not directly above) camera 612.

In an adjustable system, the focus component 620 may adjust a focus of image sensor(s) 610. For instance, the focus component 620 may allow for auto-focusing to capture the indicia 250. The image recognition component 630 may determine the positions of the lid 200, container 130, and/or blender base 120 based on size and/or resolutions of indicia 250. It is noted that the size of indicia 250 may be compared to sizes of features of the container 130. In an example with reference to FIG. 5, the size of indicia 250 may be compared with a size of at least one of radial shoulder 142, handle 150, or spout 152. In another aspect, the image recognition component 630 may determine positions based on information associated with the auto-focusing. For example, focusing may include adjusting parameters, such as magnification. The levels of magnification may be utilized to determine relative locations/positions of lid 200 and/or container 130. As described herein, distance 10 may be associated with an appropriate or operable position. This distance 10 may also be associated with one or more parameters, such as a level of magnification. In an aspect, the interlock detector 600 may utilize the location information to determine alignment and/or to determine how a user may adjust the blending system 100 to achieve proper alignment and may communicate steps to adjust the system via a display.

According to at least one embodiment, the focus component 620 may utilize image stabilization techniques. The image stabilization techniques may generally reduce errors due to vibration of the blending system 100. For instance, during use, the blending system 100 may vibrate from operation of the motor 30, user manipulation, or the like. Focus component 620 may utilize, for example, orthogonal transfer CCD stabilization, filters, optical stabilization, digital stabilization, sensor shift, a gyroscope, or the like.

It is noted that the image recognition component 630 may utilize other processes to determine positions as described herein. It is further noted that a location, distance, and/or position may be measured in units of distance, by a binary state (e.g., aligned or not aligned), by ranges (e.g., near, far, correct, etc.), or by other desired metrics.

In another aspect, image recognition component 630 may utilize pattern (e.g., image, object, etc.) recognition processes to identify lid 200, container 130, other objects, and/or lack thereof. For instance, image recognition component 630 may recognize geometry of the blending system 100 (e.g., the container 130, lid 200, etc.) to determine if the lid 200 is operatively positioned on the container 130, determine if the container 130 is in an operative position, and/or a combination of such. The image recognition component 630 may identify the geometry of the container 130, such as particular curves, lines, grooves, notches, indicia, or a combination of such, similar to the indicia 250 above. For example, if the container 130 is in the operative position and/or the lid 200 is operatively coupled with the container 130, the image recognition component 630 may send a signal to interlock control component 640 to indicate such. Interlock control component 640 may then allow rotation of the blade 102. Otherwise, the rotation of the blade 102 may be generally prevented.

In an example, image recognition component 630 may determine whether blending system 100 is interlocked based on a stored reference image, pattern, or the like. The reference image (or a suitable representation thereof) may be stored, for example, in memory 602, in coded information of a barcode, such as indicia 250, or the like. In an example, image recognition component 630 may utilize a homography matching process, fundamental matrix constraint process, or other process to compare a captured image with the reference image. In this example, the comparison may be utilized to determine whether or not the blending system 100 is operatively interconnected. For instance, the comparison process may render a match score. The match score may identify a level of certainty as to whether the blending system 100 is operatively interconnected. If the match score exceeds a threshold, the image recognition component 630 may determine that the operative state of the blending system 100 is "operatively interconnected." In another aspect, if the match score does not exceed a threshold, image recognition component 630 may determine that the operative state of the blending system 100 is "not-interconnected." It is noted blending system 100 may have different operative states that describe whether or not the system is operatively interconnected. For instance, operative states may identify whether a proper combination of lid 200, container 130, and/or blender base 120 are utilized, whether improper objects are disposed within the container 130 (e.g., metal utensils, a user's hand, etc.), whether the components of blending system 100 are aligned, operatively connected, damaged, or the like.

It is noted that various embodiments may utilize pattern recognition to identify indicia and/or shapes or objects (e.g., containers, lids, utensils, hands, etc.). Accordingly, while described examples may refer to identifying indicia or shapes, it is noted that such examples may utilize the other or both processes. It is further noted that the described embodiments may additionally or alternatively utilize other processes (e.g., laser scanning) to identify objects and/or locations of objects.

Interlock control component 640 may control availability of motor 30. For instance, interlock control component 640 may control whether the motor 30 may be operated and/or may turn off/disrupt the motor during operation. In an example, the interlock control component 640 may prevent operation of the motor 30 (e.g., prevent rotation of blade 102) based on whether the lid 200 and/or container 130 are operatively interconnect with the blender base 120. If the blending system 100 is not operatively interconnected (and/or proper lid 200/container 130/blender base 120 are not utilized), the interlock control component 640 may interrupt a power supply to the motor 30 or otherwise prevent rotation of the blade 102. In another aspect, if lid 200 is covering the opening 140 of container 130 such that it prevents a user from being able to insert his or her hand into the container 130, the interlock control component 640 may allow operation of motor 30.

Interlock detector 600 may be configured to generally reduce (e.g., prevent) a user's ability to circumvent interlock detection. For example, the interlock detector 600 may be calibrated to disengage or disable the motor 30 (or otherwise prevent rotation of the blade 102) anytime the indicia 250 is not viewable, the blending system 100 is not interlocked (e.g., as determined by image recognition component 630), or the like. In another instance, if the lid 200, container 130, and blender base 120 are not within a determined range of acceptable alignments, the interlock control component 640 may disable motor 30. It is noted that the interlock detector 600 may be calibrated to allow variances due to vibration, a user shaking a lid to free foodstuff therefrom, or the like.

In one or more examples, interlock control component 640 may receive an instruction indicating an operative state of the blending system 100. As described herein, the operative state may indicate whether the blending system 100 is interlocked, whether proper components are utilized, whether inappropriate objects are within the container 130, and the like. Upon receipt of the instruction, the interlock control component 640 may permit and/or prevent rotation of the blade 102. For instance, the interlock control component 640 may be able to determine if a foreign object is positioned in the container 130. In that situation, if the image recognition component 630 determines that the foreign object (such as a spoon) is in the container 130, and interlock control component 640 may generally prevent rotation of the blade 102.

Figure 7:
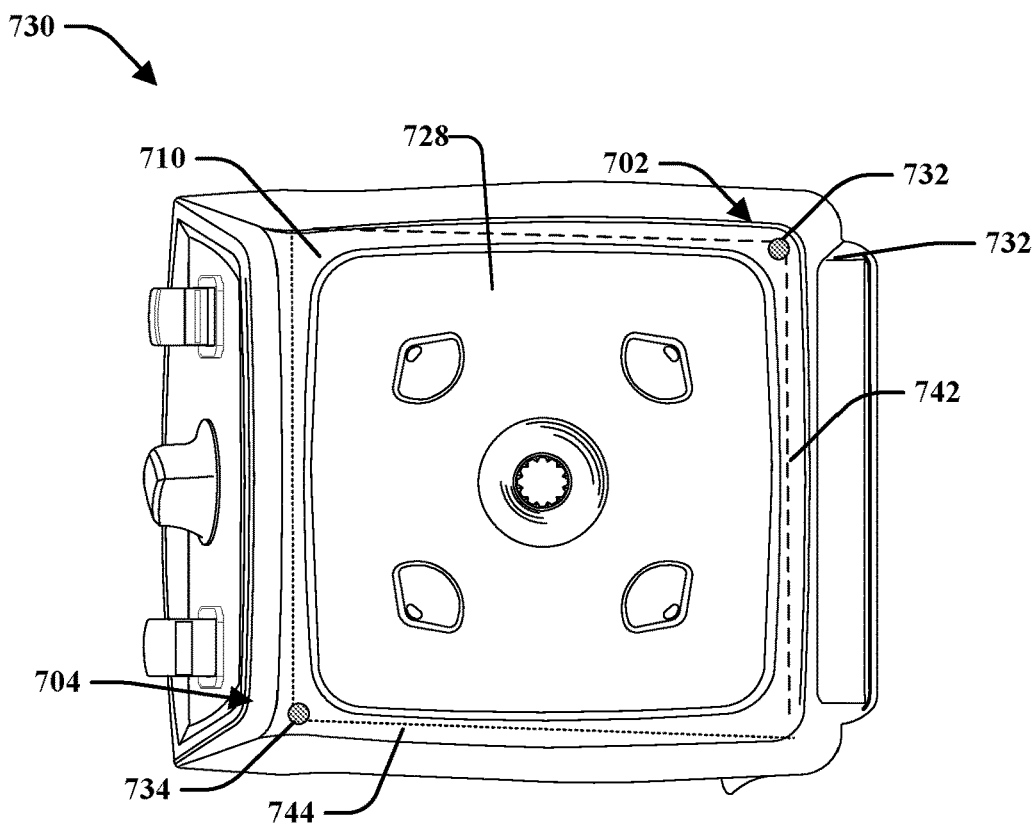
FIG. 7 is a top view of an embodiment of a blending system comprising a plurality of image sensors in accordance with aspects of the present disclosure.

Turning now to FIG. 7, there is a blender base 730 according to various disclosed aspects. Blender base 730 may utilize various disclosed aspects. For instance, blender base 730 may comprise interlock detector 600 and/or may be operably coupled with container 130 and/or lid 200. As shown in FIG. 7, the blender base 730 may comprise a plurality of image sensor(s), such as camera 732 and camera 734. It is noted that the blender base 730 may include different types and/or numbers of (e.g., more or less) image sensors. In an aspect, cameras 732 and 734 may be generally flush with an upper surface 710 of the blender base 730. In another aspect, the cameras 732 and 734 may be disposed beneath a protective surface or shroud. This may protect cameras 732 and 734, and may allow a user to wipe or clean upper surface 710 without risk of damaging the cameras 732 and 734.

According to at least one embodiment, cameras 732 and 734 may be positioned generally about opposed corners. For example, camera 732 may be disposed near corner 702, while camera 734 may be disposed near corner 704. A field of view 742 of camera 732 and a field of view 744 of camera 734 may generally encompass all or a majority of possible arrangements of base 730, container 130, and/or lid 200. It is noted here, as well as elsewhere, that blender base 730 may include a different number of cameras disposed about different portions or areas of blender base 730. As shown in FIG. 1, camera 612 may be positioned generally along a side of an upper surface 112 of a blender base 120 and/or generally around pedestal 728. In an aspect, the cameras 732 and 734 may be positioned a distance from pedestal 728 to allow for a container to be attached thereto.

Interlock detector 600 may be configured to utilize one or more cameras 732 and 734 to determine whether a blending system is interlocked. In an aspect, image recognition component 630 may identify indicia on a plurality of protrusions of a lid, on a container (e.g., walls, handle, spout, etc.), or the like. In another aspect, image recognition component 630 may recognize objects based on shapes, sizes, and/or other physical features. For example, a user may attach a lid to a container for a blending process. During the blending process, the user may lift one side of the lid to access foodstuff, while the other side remains in about the same position. By using a plurality of cameras, the interlock detector 600 may determine that one side of the lid is no longer in an appropriate position for blending, and that the motor should be stopped.

Figure 8:
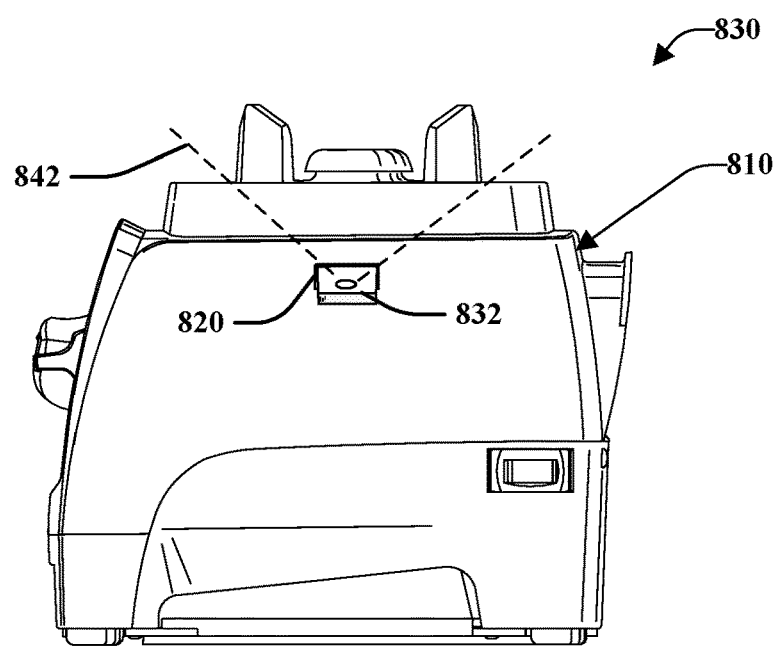
FIG. 8 is a side view of an embodiment of a blending system comprising a removable image sensor in accordance with aspects of the present disclosure.

It is further noted that disclosed blending systems may utilize cameras that are not housed within and/or integral with a blender base, such as a camera of a smart phone, a removable dongle (e.g., plugged into a communication port), or the like. As shown in FIG. 8, blender base 830 may include a communications port 820 disposed about a housing 810. The communications port 820 may comprise any appropriate type of communications port, such as, but not limited to, a USB port, micro-USB port, mini-USB port, or the like. A removable dongle and/or removable camera 832 may be operatively coupled to the communications port 820. It is noted that the removable camera 832 may comprise a portion of interlock detector 600, such as at least one image sensor 810. In another aspect, the removable camera 832 may be utilized with and/or without other cameras.

It is further noted that multiple cameras may be utilized to determine that the location of the indicia 250 or other portions of blending system 100. In an example, the cameras or other sensors may be positioned along/within the blender base 120 and, in particular, the cameras may be positioned along a perimeter of the container 130 (when attached to the blender base 120) to detect the indicia 250. Additionally, a plurality of indicia 250 may be positioned along the lid 200, a plurality of protrusion 220 positioned along the lid, or both are contemplated by this disclosure. Any appropriate number of indicia 250, cameras and/or protrusions 220 may be utilized without departing from the present teachings. Further still, the number of indicia 250 and cameras may be the same or may in some embodiments be a different number thereof.

Figure 9:
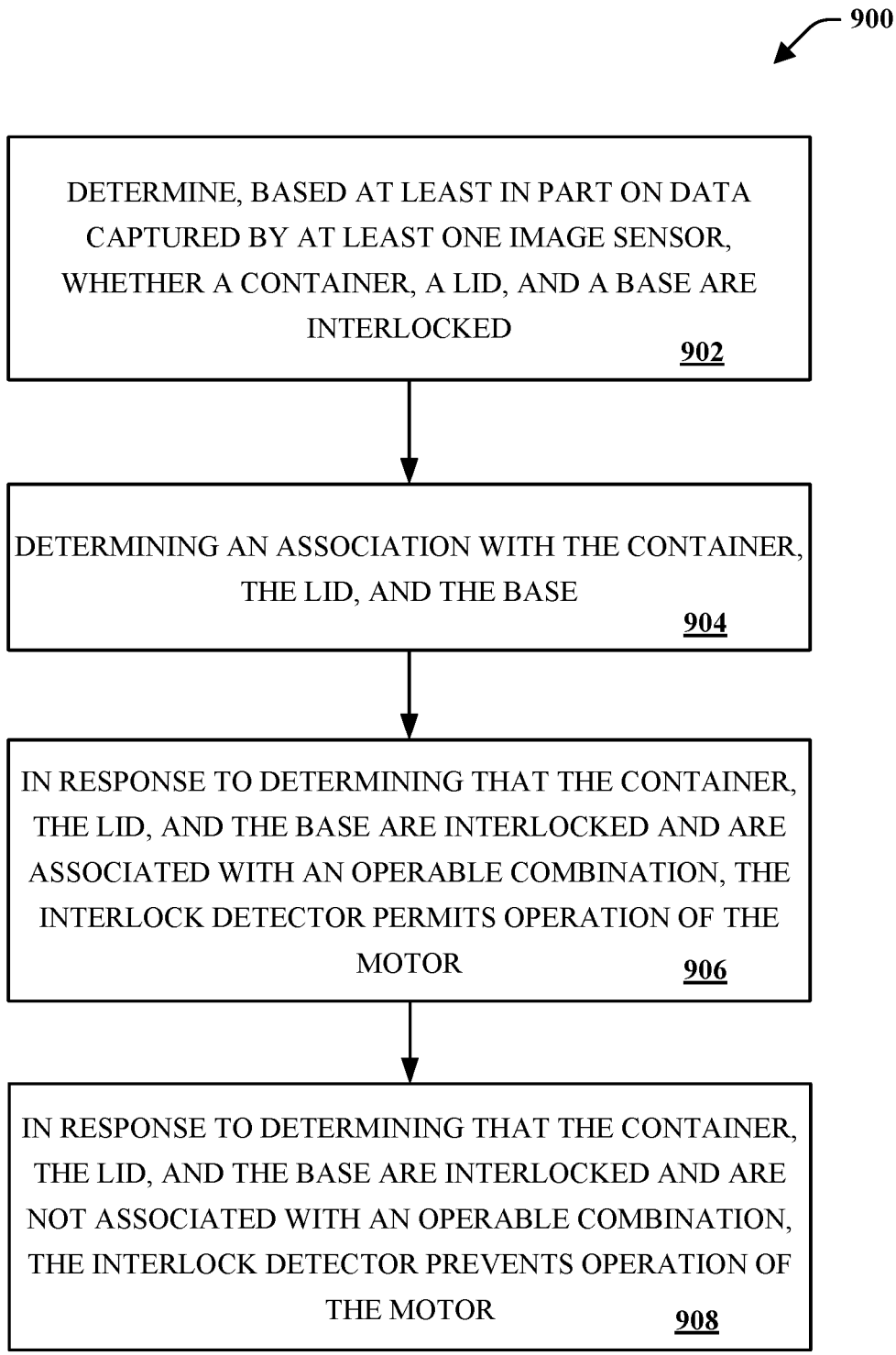
FIG. 9 is an exemplary method association with a blending system comprising a removable image sensor in accordance with aspects of the present disclosure.

In view of the subject matter described herein, methods that may be related to various embodiments may be better appreciated with reference to the flowcharts of FIGS. 8-9. While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 9 depicts an exemplary flowchart of non-limiting method 900 associated with a blending system, according to various aspects of the subject disclosure. As an example, method 900 may determine operative positions of portions of the blending system, including associations between the portions of the blending system. Further, method 900 may facilitate control of a motor based on the operative positions and associations.

At 902, a system (e.g., blending system 100) may determine, based at least in part on data captured by at least one image sensor, whether a container, a lid, and a base are interlocked. This may include, for example, determining that a lid is operatively connected to an open end of a container when in a closed position (e.g., first position). In another aspect, this may include determining that the lid is not operatively connected to the open end of the container, and thus the lid is in an open position (e.g., second position). It is noted that the method, may include applying image recognition processes.

At 904, the system may determine an association with the container, the lid, and the base. In an example, the determination may be based at least in part on image recognition of the portions of the blending system. In one aspect, known associations may be stored in a memory device, may be received from wireless communications, may be identified via coded information (e.g., barcodes), or the like.

At 906, in response to determining that the container, the lid, and the base are interlocked and are associated with an operable combination, the interlock detector permits operation of the motor. At 908, in response to determining that the container, the lid, and the base are interlocked and are not associated with an operable combination, the interlock detector prevents operation of the motor. In an aspect, method 900 may generally reduce (e.g., prevent) a user from bypassing interlock detection.

Figure 10:
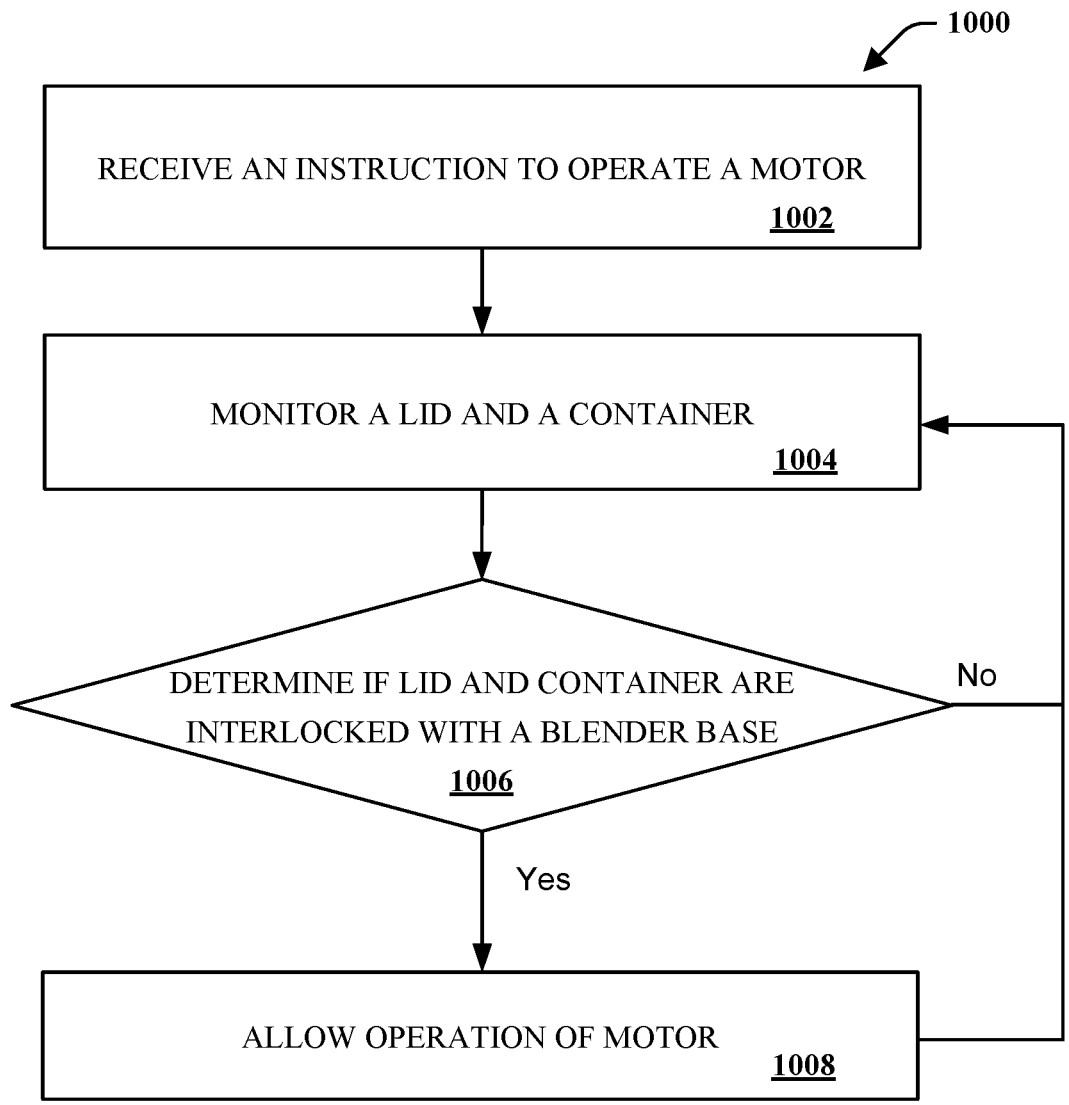
FIG. 10 is another exemplary method association with a blending system comprising a removable image sensor in accordance with aspects of the present disclosure.

FIG. 10 depicts an exemplary flowchart of non-limiting method 1000 associated with a blending system, according to various aspects of the subject disclosure. As an example, method 1000 may allow a blending system to control operation of a motor based on determining whether portions of the blending system are interlocked.

At 1002, a system (e.g., blending system 100) may receive an instruction to operate a motor of a blender. For instance, a user may interact with controls on a control panel of a blender base. The control panel may send a signal to, for example, a processor (e.g., processor 604).

At 1004, the system may monitor a lid and a container. Monitoring the lid and container may include determining whether a lid and container are present, determining locations of the lid and container, and the like. In another aspect, monitoring the lid and container may include applying image recognition processes to identify or recognize objects, indicia, physical features, or other parameter of a blending system.

At 1006, the system may determine if the lid and the container are interlocked with a blender base. As described herein, determining whether the system is interlocked may include determining locations of portions of the blending system. For example, a relative position of the lid may be determined. If the lid and container are not interlocked with the base (e.g., the lid is not attached), then the system may continue to monitor for the lid and the container at 1004. If it is determined that the lid and container are interlocked with the blender base, the method may continue at 1008. At 1008, the system may allow operation of the motor, such as by allowing power to flow to a motor. The motor may then cause rotation of a blade.

As used herein, terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor. Moreover, such terms may be localized to one computer and/or may be distributed across multiple computers.

Moreover, processing units may comprise various hardware processing devices, such as single core or multi-core processing devices. Moreover, processing unit(s) may refer to a "processor," "controller," "computing processing unit (CPU)," or the like. Such terms generally relate to a hardware device. Additionally, processing unit(s) may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the like.

In another aspect, system memory may include one or more types of memory, such volatile memory (e.g., random access memory (RAM)) and non-volatile memory (e.g., read-only memory (ROM)). ROM may include erasable programmable ROM (EPROM), electrically erasable programmable ROM (EEPROM). In various embodiments, processing unit(s) may execute computer executable instructions stored in system memory, such as operating system instructions and the like.

Although the embodiments of the present teachings have been illustrated in the accompanying drawings and described in the foregoing detailed description, it is to be understood that the present teachings are not to be limited to just the embodiments disclosed, but that the teachings described herein are capable of numerous rearrangements, modifications and substitutions.

What is claimed is:

1. A blending system comprising:
a base housing a motor;
a container operatively coupled to the base;
a blade assembly operatively disposed within the container, the blade assembly operatively engaged with the motor;
a lid operatively attached to the container; and
an interlock detector comprising at least one image sensor disposed within the base and positioned such that a field of view of the at least one image sensor covers an area above the base where, when in an operative position, a plurality of portions of the container and the lid are disposed, and wherein the interlock detector processes, based at least in part on data captured by the at least one image sensor, spatial positions of the container and lid relative to the base to determine whether the container, the lid, and the base are interlocked.

2. The blending system of claim 1, wherein the interlock detector further controls operation of the motor based on determining whether the container, the lid, and the base are interlocked.

3. The blending system of claim 2, wherein
in response to determining that the container, the lid, and the base are interlocked, the interlock detector permits operation of the motor; and
in response to determining that the container, the lid, and the base are not interlocked, the interlock detector prevents operation of the motor.

4. The blending system of claim 2, wherein the interlock detector further controls operation of the motor based on determining an association with the container, the lid, and the base.

5. The blending system of claim 4, wherein
in response to determining that the container, the lid, and the base are interlocked and are associated with an operable combination, the interlock detector permits operation of the motor; and
in response to determining that the container, the lid, and the base are interlocked and are not associated with an operable combination, the interlock detector prevents operation of the motor.

6. The blending system of claim 1, wherein the at least one image sensor comprises at least one of camera, a laser sensor, or a scanner configured to communicate with the interlock control component.

7. The blending system of claim 1, wherein the lid comprises at least one indicia disposed thereon, the indicia configured to be recognizable by the interlock detector.

8. The blending system of claim 7, wherein the lid includes a protrusion and wherein the at least one indicia is disposed on the protrusion.

9. The blending system of claim 8, wherein the protrusion extends outwardly such that, when the lid is operatively attached to the container, at least a portion of the protrusion is in the field of view of the at least one image sensor.

10. The blending system of claim 7, wherein the indicia is at least one of a one-dimensional barcode or a two-dimensional barcode.

11. A blending system comprising:
a base comprising a housing, the housing encasing a motor;
a blade within a container;
a lid configured to cover an open end of the container; and
an interlock detector comprising a camera disposed within the base and operatively capturing one or more images of an area above the housing,
wherein the interlock detector utilizes a pattern recognition process on the one or more images to recognize characteristics of the lid and the container in the one or more images to determine whether the container, lid, and housing are arranged in an operative position, and
wherein the interlock detector controls operation of the motor based on determining that the container, lid, and housing are arranged in an operative position.

12. The blending system of claim 11, wherein the interlock detector further determines the position of the lid based on the pattern recognition process.

13. The blending system of claim 11, wherein the camera comprises a lens, the lens disposed proximal to a surface of the housing.

14. The blending system of claim 11, wherein the camera further comprises a field-of-view directed towards the open end of the container such that at least a portion of the lid is within the field of view when the lid covers the open end of the container.

15. A blending system comprising:
a base comprising a motor;
a blade in operative communication with the motor and selectively engaged with the base;
a container having an open end, a closed end, and a radial wall disposed between the open end and closed end, wherein the closed end is operatively coupled to the blade;
a lid operatively connected to the open end when in a closed position, wherein the lid comprises at least one indicia disposed thereon; and
an interlock detector comprising one or more image sensors disposed on the base for determining, based at least in part on the one or more image sensors detecting the indicia, the spatial relationship of the lid relative to the container and the base, to control operability of the motor, wherein the one or more image sensors comprise a focusable lens.

16. The blending system of claim 13, wherein the lens comprises at least one of a manual-focus or an automatic-focus lens.

17. The blending system of claim 13, wherein the lens comprises at least one of a fixed-focus or a full-focus lens.

18. The blending system of claim 1, wherein the plurality of portions of the container comprises at least one of a wall, a shoulder, a spout, or a handle.

* * * * *